United States Patent
Yan et al.

(10) Patent No.: US 12,427,849 B2
(45) Date of Patent: Sep. 30, 2025

(54) DRIVER OF AUTOMATIC GUIDED VEHICLE

(71) Applicants: NIDEC CORPORATION, Kyoto (JP); Nidec Taiwan Corporation, Taipei (TW)

(72) Inventors: Guo-Jhih Yan, Taipei (TW); Keng-Chang Wu, Taipei (TW); Huu-Tich Ngo, Taipei (TW); Kuo-Min Wang, Taipei (TW); Hsiu-Ying Lin, Taipei (TW)

(73) Assignees: NIDEC CORPORATION, Kyoto (JP); Nidec Taiwan Corporation, Taipei (TW)

( * ) Notice: Subject to any disclaimer, the term of this patent is extended or adjusted under 35 U.S.C. 154(b) by 256 days.

(21) Appl. No.: 17/746,968

(22) Filed: May 18, 2022

(65) Prior Publication Data
US 2022/0379716 A1 Dec. 1, 2022

(30) Foreign Application Priority Data
May 27, 2021 (JP) .................................. 2021-089559

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/046* (2013.01); *B60W 60/001* (2020.02);
(Continued)

(58) Field of Classification Search
CPC ................ B60K 7/0007; B60K 17/046; B60K 2007/003; B60K 2007/0092; B60W 60/001; F16H 37/065
(Continued)

(56) References Cited

U.S. PATENT DOCUMENTS

| | | | |
|---|---|---|---|
| 6,491,127 B1 | 12/2002 | Holmberg et al. | |
| 11,073,198 B1* | 7/2021 | Magnus | F16H 48/20 |
| 2021/0252977 A1* | 8/2021 | Engerman | B60K 1/00 |

FOREIGN PATENT DOCUMENTS

| | | | |
|---|---|---|---|
| CN | 104085439 | | 10/2014 |
| CN | 210397599 U | * | 4/2020 |

(Continued)

OTHER PUBLICATIONS

Aren_Hill, "Pic: Differential Swerve Module (971)," 2017, chiefdelphi forum post (Year: 2017).*

*Primary Examiner* — Helal A Algahaim
*Assistant Examiner* — Karen Lynelle Furgason
(74) *Attorney, Agent, or Firm* — JCIPRNET (57) ABSTRACT

A driver of an automatic guided vehicle includes a crown gear (turning gear) fixed to a bottom of a vehicle body, a support shaft penetrating a center of the crown gear and extending vertically from the vehicle body, a frame supported by the support shaft to be rotatable on a horizontal plane, a wheel axle rotatably and horizontally provided on the frame, and a wheel connected to the wheel axle. A first motor and a second motor, which are drive sources, and a first planetary gear mechanism and a second planetary gear mechanism are provided at both ends in an axial direction of the wheel axle, respectively. Each carrier of the first and second planetary gear mechanisms is connected to the wheel axle, and each ring gear of the first and second planetary gear mechanisms meshes with the crown gear.

7 Claims, 9 Drawing Sheets

(51) Int. Cl.
*B60W 60/00* (2020.01)
*F16H 37/06* (2006.01)

(52) U.S. Cl.
CPC ...... *F16H 37/065* (2013.01); *B60K 2007/003* (2013.01); *B60K 2007/0092* (2013.01)

(58) Field of Classification Search
USPC .......................................................... 701/23
See application file for complete search history.

(56) References Cited

FOREIGN PATENT DOCUMENTS

| | | | | |
|---|---|---|---|---|
| CN | 212959705 | | 4/2021 | |
| DE | 102019132989 A1 | * | 7/2020 | ............... B60K 1/00 |
| JP | 66078831 | | 5/1985 | |

* cited by examiner

|  | $\omega_1$ | $\omega_2$ | $\omega_3$ | $\omega_4$ | $\omega_5$ | $\omega_6$ | $\omega_7$ |
|---|---|---|---|---|---|---|---|
| Traveling straight | 100 | 100 | 20 | 20 | 0 | 0 | 0 |
| Turning and traveling | 120 | 80 | 20 | 20 | −5 | 5 | 1 |
| Turning only | 20 | −20 | 0 | 0 | −5 | 5 | 1 |

|  | $\omega_1$ | $\omega_3$ | $\omega_5$ | $\omega_7$ | Br1 | Br2 |
|---|---|---|---|---|---|---|
| Traveling straight | 100 | 20 | 0 | 0 | OFF | ON |
| Turning and traveling | 120 | 20 | −5 | 1 | OFF | OFF |
| Turning only | 100 | 0 | −25 | −5 | ON | OFF |

FIG. 9

DRIVER OF AUTOMATIC GUIDED VEHICLE

CROSS REFERENCE TO RELATED APPLICATIONS

The present invention claims priority under 35 U.S.C. § 119 to Japanese Application No. 2021-089559 filed on May 27, 2021 the entire content of which is incorporated herein by reference.

BACKGROUND

Field of the Invention

The disclosure relates to a driver of an automatic guided vehicle in which a planetary gear mechanism is provided in a power transmission path of an electric motor as a drive source.

Background

Automated guided vehicles (AGVs) are widely used for transporting raw materials, parts, finished products, and the like mainly at production sites, and have also been widely introduced in various non-manufacturing fields such as distribution centers and hospitals that store and ship products.

By the way, due to the remarkable progress of artificial intelligence and control in recent years, smart automatic guided vehicles able to cooperate with human beings at workplaces, in households, in public places, and the like have appeared. When such an automatic guided vehicle operates in a complicated environment or an area of a limited space, it is very useful that the automatic guided vehicle has a function of being able to move in all directions. For such an automatic guided vehicle able to move in all directions, an omnidirectional wheel (universal wheel) provided with a passive roller perpendicular to the wheel axle and a roller oriented at an angle of 45 degrees (Mecanum wheel) have been proposed and have already been put into practical use.

However, conventional omnidirectional wheels are complicated to manufacture, are vulnerable to unevenness on the road surface, and have problems such as a limited load capacity, and their applications are limited.

Therefore, a normal wheel with both driving and turning functions is still used, but in order to realize the driving and turning of this wheel, a driver is adopted in which a drive motor for driving and a swivel motor for steering are independently provided.

However, if a configuration is adopted in which the drive motor and the swivel motor are provided independently, since the drive motor and the swivel motor operate independently of each other, the drive motor and the swivel motor require extra driving force. Therefore, there is a problem that the driver provided with the drive motor and the swivel motor becomes large, and the power consumption of the driver increases.

SUMMARY

A driver of an automatic guided vehicle according to a first exemplary embodiment of the disclosure includes a turning gear fixed to a bottom of a vehicle body; a support shaft penetrating a center of the turning gear and extending vertically from the vehicle body; a frame supported by the support shaft to be rotatable on a horizontal plane; a wheel axle rotatably and horizontally provided on the frame; and a wheel connected to the wheel axle. A first motor and a second motor, which are drive sources, and a first planetary gear mechanism and a second planetary gear mechanism are provided at both ends in an axial direction of the wheel axle, respectively. Each carrier of the first and second planetary gear mechanisms is connected to the wheel axle, and each ring gear of the first and second planetary gear mechanisms meshes with the turning gear.

Further, a driver of an automatic guided vehicle according to a second exemplary embodiment of the disclosure includes a turning gear fixed to a bottom of a vehicle body; a support shaft penetrating a center of the turning gear and extending vertically from the vehicle body; a frame supported by the support shaft to be rotatable on a horizontal plane; a wheel axle rotatably and horizontally provided on the frame; and a wheel connected to the wheel axle. A motor, which is a drive source, and a planetary gear mechanism are provided at one end in an axial direction of the wheel axle; a first brake is attached to the other end in the axial direction of the wheel axle; and a second brake is attached to the support shaft. A carrier of the planetary gear mechanism is connected to the wheel axle, and a ring gear of the planetary gear mechanism is meshed with the turning gear.

The above and other elements, features, steps, characteristics and advantages of the present disclosure will become more apparent from the following detailed description of the preferred embodiments with reference to the attached drawings.

DESCRIPTION OF EMBODIMENTS

First, a first exemplary embodiment of the disclosure will be described below with reference to FIGS. 1 to 5.

Figure 1:
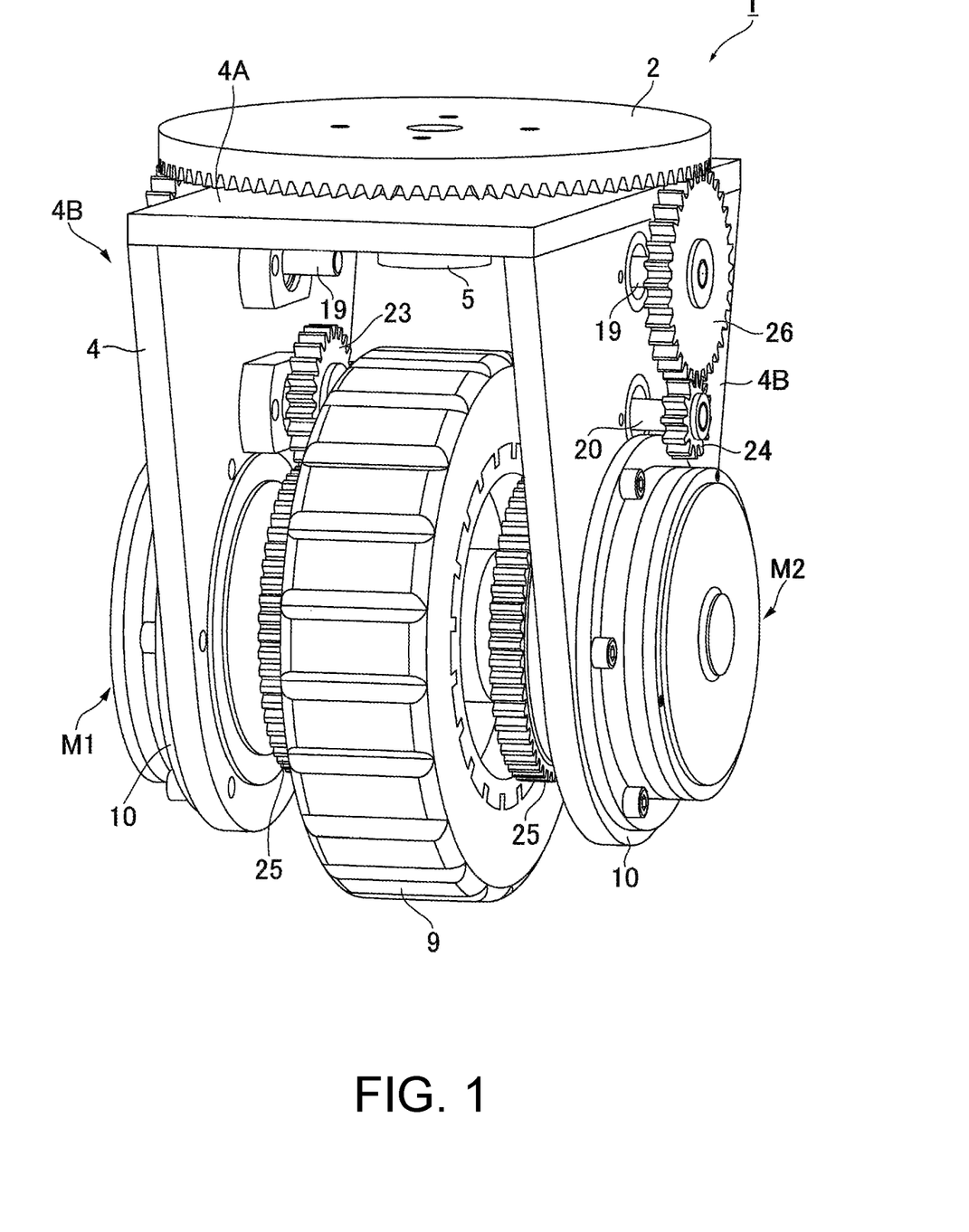
FIG. 1 is a perspective diagram of a driver of an automatic guided vehicle according to the first exemplary embodiment of the disclosure.
Figure 2:
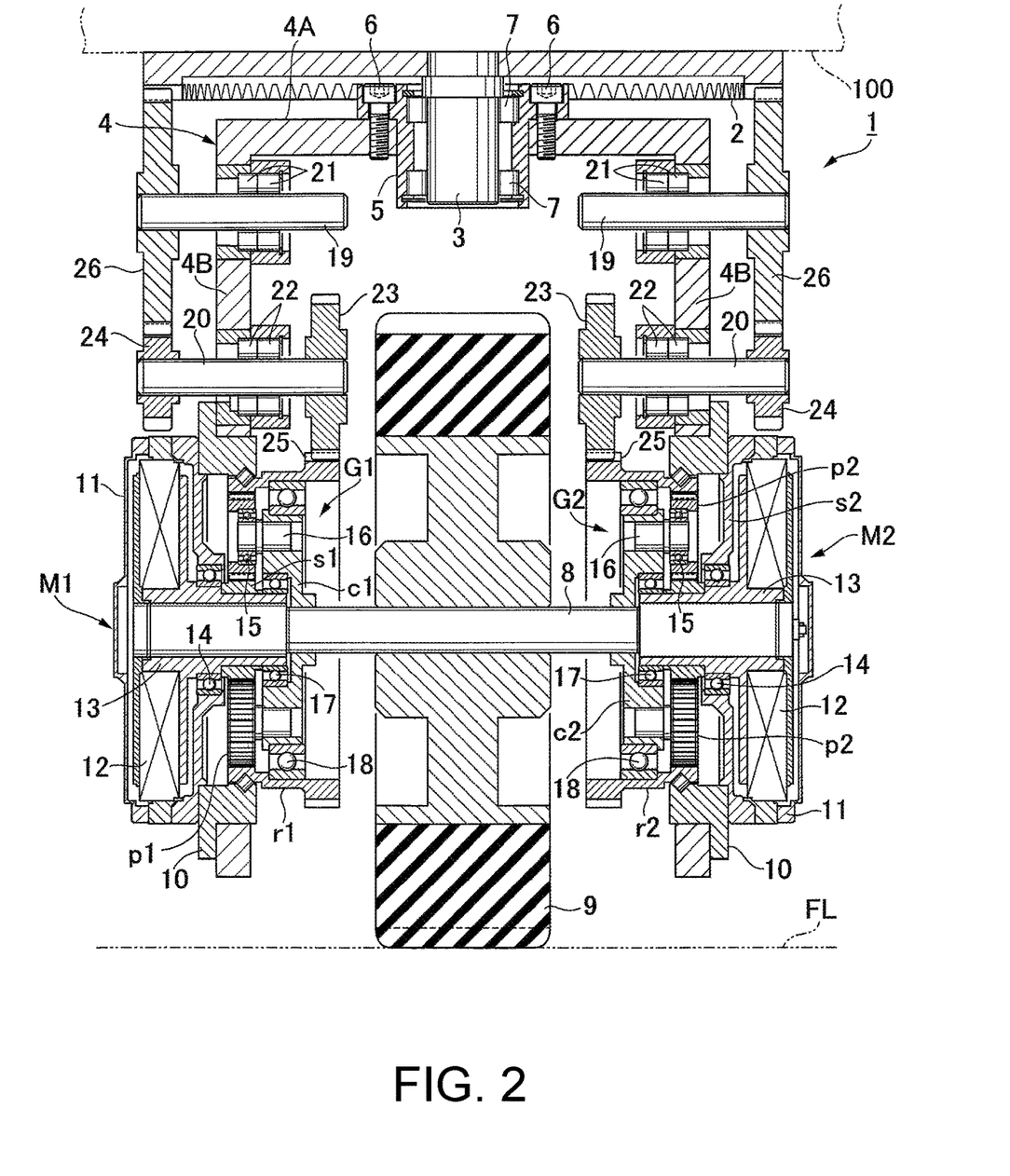
FIG. 2 is a vertical cross-sectional diagram of the driver of the automatic guided vehicle according to the first exemplary embodiment of the disclosure.
Figure 3:
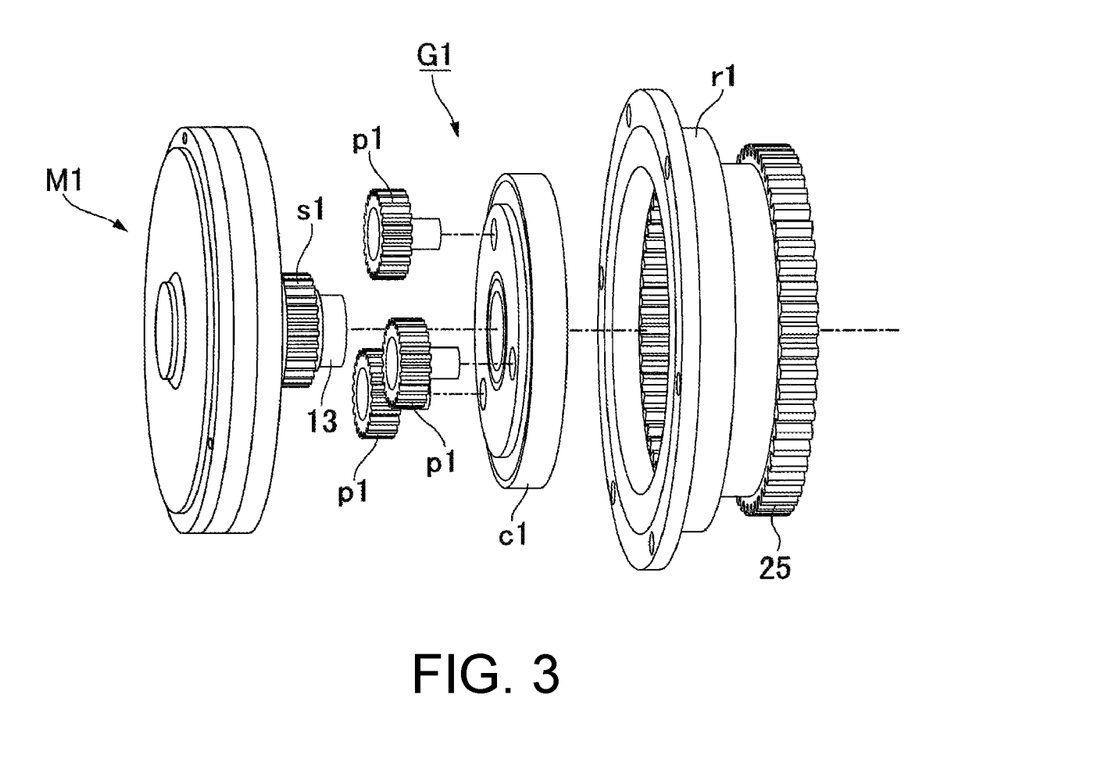
FIG. 3 is an exploded perspective diagram of a motor and a planetary gear mechanism of the driver of the automatic guided vehicle according to the first exemplary embodiment of the disclosure.
Figure 4:
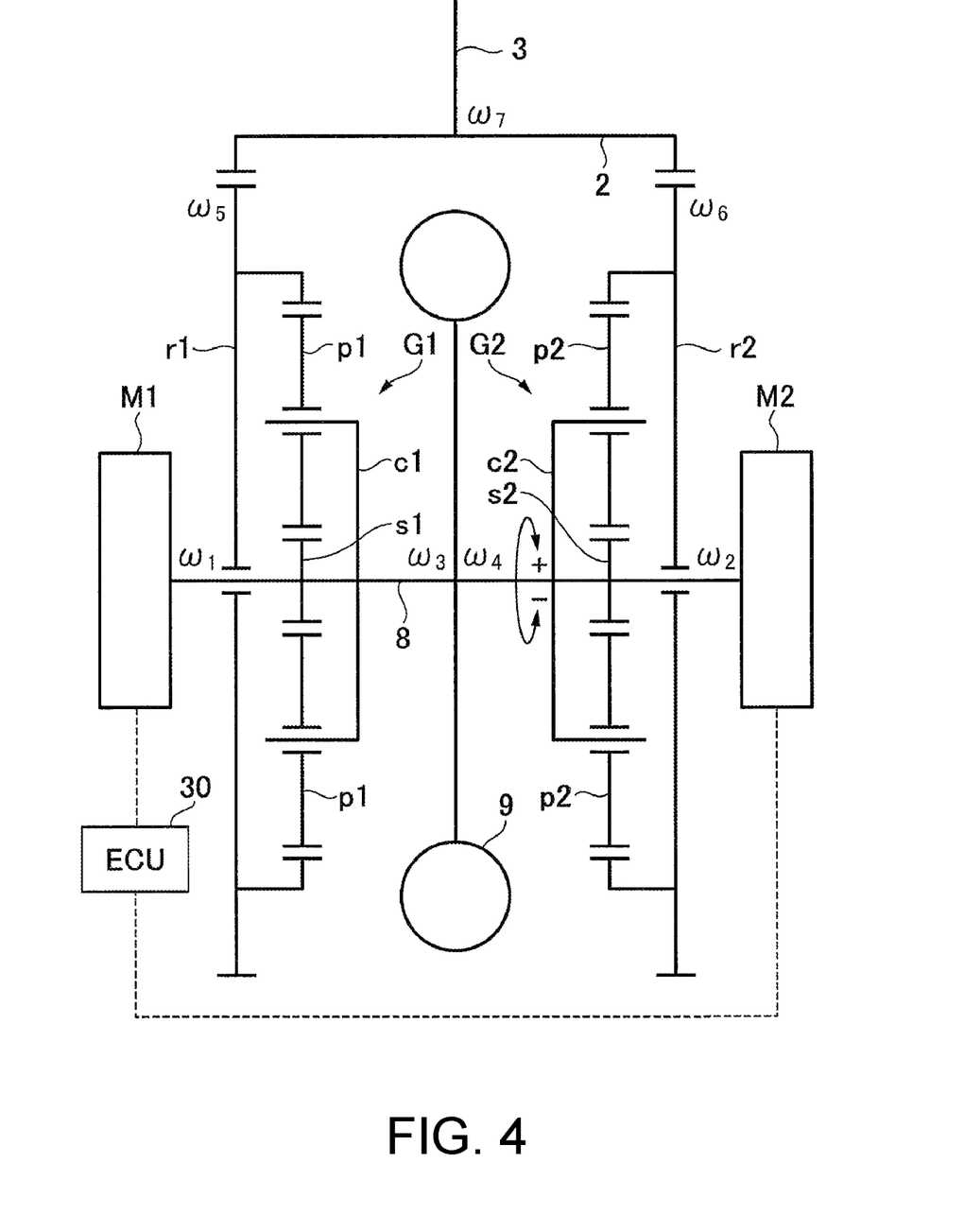
FIG. 4 is a diagram schematically showing a configuration of a drive system of the driver of the automatic guided vehicle according to the first exemplary embodiment of the disclosure.
Figure 5:
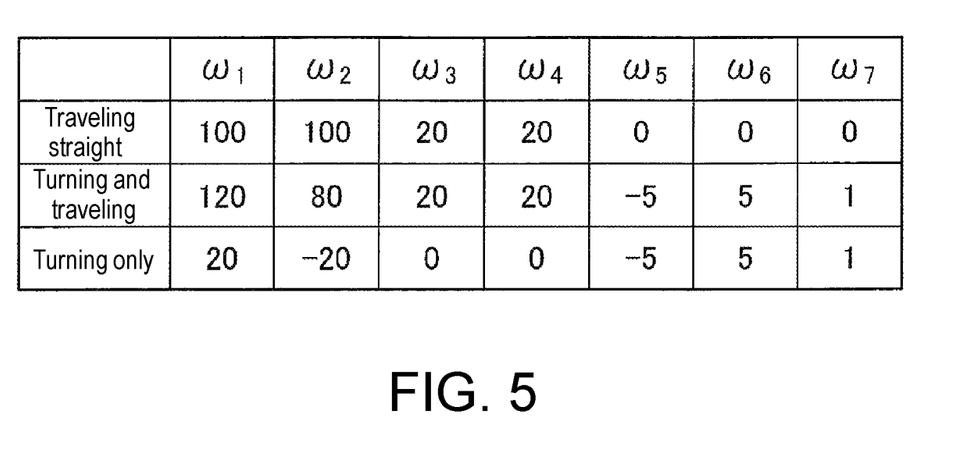
FIG. 5 is a diagram showing values of the angular velocities of each rotator of the driver of the automatic guided vehicle according to the first exemplary embodiment of the disclosure in a table.

FIG. 1 is a perspective diagram of a driver of an automatic guided vehicle according to the first exemplary embodiment of the disclosure. FIG. 2 is a vertical cross-sectional diagram of the same driver. FIG. 3 is an exploded perspective diagram of a motor and a planetary gear mechanism of the same driver. FIG. 4 is a diagram schematically showing a configuration of a drive system of the same driver. FIG. 5 is a diagram showing values of the angular velocities of each rotator of the same driver in a table.

The driver 1 shown in FIGS. 1 and 2 is provided at the bottom of a vehicle body 100 (see FIG. 2) of the automatic guided vehicle, and allows the automatic guided vehicle to travel and turn on a floor FL (see FIG. 2), and actually multiple drivers 1 are provided. Since the configuration and operation of each driver 1 are the same, the configuration and operation of one driver 1 will be described below.

A large-diameter crown gear 2, which is a turning gear, is horizontally fixed to the bottom of the vehicle body 100 of the automatic guided vehicle so as to be in close contact with the bottom of the vehicle body 100; and a support shaft 3 extending vertically downward from the bottom surface of the vehicle body 100 penetrates through the center of the crown gear 2. The central portion of the upper end of a substantially gate-shaped frame 4 is supported by the support shaft 3 to be rotatable on a horizontal plane about the support shaft 3. Specifically, as shown in FIG. 2, a substantially cylindrical collar 5 penetrates the center of a top plate 4A of the frame 4, and the collar 5 is fixed to the top plate 4A of the frame 4 by multiple bolts 6 (only two are shown in FIG. 2). Then, the collar 5 is rotatably supported by upper and lower bearings 7 on the support shaft 3 inserted into the collar 5 from above, so that the frame 4 is supported to be rotatable on a horizontal plane about the support shaft 3 as described above.

Here, the frame 4 is provided with a pair of side plates 4B extending vertically downward from the top plate 4A in parallel with each other, and a wheel axle 8 is rotatably and horizontally provided under the side plates 4B. A wheel (drive wheel) 9 that rolls on the floor FL is inserted and fixed to the central portion of the wheel axle 8 in the axial direction, and a portion of the wheel 9 is housed in the frame 4.

Further, as shown in FIG. 2, a first motor M1 and a second motor M2, which are drive sources, are provided at both ends in the axial direction of the wheel axle 8 (left and right ends in FIG. 2), respectively. A first planetary gear mechanism G1 and a second planetary gear mechanism G2 are provided inside each of the first electric motor M1 and the second motor M2, respectively. That is, the first motor M1 and the second motor M2 and the first planetary gear mechanism G1 and the second planetary gear mechanism G2 are distributed and symmetrically provided on both sides (left and right in FIG. 2) with the wheel 9 as the center. Here, the configuration of the first motor M1 and the first planetary gear mechanism G1 on one side will be described. Since the configuration of the second motor M2 on the other side is the same as that of the first motor M1, the same elements are designated by the same reference numerals, and the description thereof will be omitted. Further, the configuration of the second planetary gear mechanism G2 is the same as that of the first planetary gear mechanism G1, but in the second planetary gear mechanism G2, the sun gear is designated by s2, the ring gear by r2, the planetary gears by p2, and the carrier by c2.

As shown in FIG. 2, the first motor M1 is a compact, thin, power-saving type capable of forward and reverse rotations, and is configured to house a stator 12 and a rotor 13 in a motor housing 11 attached to one side plate 4B of the frame 4 via a ring plate 10. Here, a three-phase coil (not shown) is wound around the stator 12, and a hollow shaft-shaped rotor (motor output shaft) 13 is fitted to one end of the wheel axle 8. The rotor 13 is rotatably supported on the motor housing 11 by a bearing 14.

Further, as shown in FIGS. 2 and 3, the first planetary gear mechanism G1 includes a small-diameter sun gear s1 attached to the outer periphery of one end of the rotor 13 facing the frame 4, a large-diameter ring gear r1 provided around the sun gear s1, three planetary gears p1 that revolve while rotating while meshing with the sun gear s1 and the ring gear r1 (see FIG. 3), and a carrier c1 that supports the planetary gears p1 so that they can rotate a bearing 15 and a shaft 16. Here, the central portion of the carrier c1 is connected to the outer periphery of the wheel axle 8, and is supported by a bearing 17 so as to be rotatable relative to the rotor 13. Further, the carrier c1 and the ring gear r1 are supported by a bearing 18 so as to be rotatable relative to each other.

By the way, on the side plate 4B of the frame 4, two upper and lower intermediate shafts 19 and 20 provided horizontally and parallel to each other are rotatably supported by two rows of bearings 21 and 22, respectively, and intermediate gears 23 and 24 having large and small different diameters are connected to both ends of the lower intermediate shaft 20 in the axial direction (inside and outside of the side plate 4B of the frame 4). Further, the intermediate gear 23 meshes with a gear 25 engraved on the outer periphery of one end in the axial direction of the ring gear r1.

In addition, a final gear 26 is connected to one end in the axial direction of the upper intermediate shaft 19 (a portion protruding outward from the side plate 4B of the frame 4), and the final gear 26 meshes with the intermediate gear 24 having a smaller diameter and meshes with the crown gear 2 having a larger diameter. Here, the two intermediate gears 23 and 24 and the final gear 26 define a gear train that transmits the rotation of the ring gear r1 to the crown gear 2, and the ring gear r1 meshes with the crown gear 2 via this gear train. The crown gear 2 and the final gear 26 that mesh with each other may be provided by bevel gears.

Although only the gear train on one side (left side in FIG. 2) has been described above, the configuration of the gear train on the other side (right side in FIG. 2) is the same as that of the gear train on the one side. The elements are designated by the same reference numerals, and the description thereof will be omitted again.

In the driver 1 provided as described above, each pair of the first and second electric motors M1 and M2, the first and second planetary gear mechanisms G1 and G2, and the gear trains (the intermediate gears 23 and 24 and the final gear 26) are symmetrically provided on both sides (left and right in FIG. 2) of the wheel 9.

Here, the configuration of the drive system of the driver 1 according to this embodiment is schematically shown in FIG. 4. In this figure, the ring gears r1 and r2 each include two intermediate gears 23 and 24 and one final gear 26. For convenience, these ring gears r1 and r2 are shown as directly meshing with the crown gear 2.

Further, the driver 1 according to the disclosure includes an electronic control unit (ECU) 30 as a controller for controlling the rotation direction and the rotation speed of each of the first motor M1 and the second motor M2, and the ECU 30 and the first and second motors M1 and M2 are electrically connected to each other.

Here, as shown in FIG. 4, the angular velocity of the first motor M1 is $\omega_1$; the angular velocity of the second motor M2 is $\omega_2$; the angular velocity of the carrier c1 of the first planetary gear mechanism G1 is $\omega_3$; the angular velocity of the carrier c2 of the second planetary gear mechanism G2 is $\omega_4$; the angular velocity of the ring gear r1 of the first planetary gear mechanism G1 is $\omega_5$; the angular velocity of the ring gear r2 of the second planetary gear mechanism G2 is $\omega_6$; the turning angular velocity of the wheel 9 is $\omega_7$; the gear ratio of the sun gears s1 and s2 to the ring gears r1 and r2 is $\xi$; and the gear ratio of the ring gears r1 and r2 to the crown gear 2 is $\varepsilon$, and the following equations hold between them. As shown in FIG. 4, the + direction of the illustrated arrow of the wheel axle 8 is forward rotation, and the − direction is reverse rotation.

$$\omega_1 = (1+\xi)\omega_3 - \xi\omega_5 \quad (1)$$

$$\omega_2 = (1+\xi)\omega_4 - \xi\omega_6 \quad (2)$$

Here, since the carrier c1 of the first planetary gear mechanism G1 and the carrier c2 of the second planetary gear mechanism G2 are both connected to the wheel axle 8, their angular velocities $\omega_3$ and $\omega_4$ are always equal to each other. Therefore, the following equation holds.

$$\omega_3 = \omega_4 \quad (3)$$

Therefore, the following equation is derived from the above equations (1) to (3).

$$\omega_1 - \omega_2 = \xi(\omega_6 - \omega_5) \quad (4)$$

Further, in order for the frame 4 to rotate about the support shaft 3 and the wheel 9 (automatic guided vehicle) to be able to turn, it is necessary that the angular velocity $\omega_5$ of the ring gear r1 of the first planetary gear mechanism G1 and the angular velocity $\omega_6$ of the ring gear r2 of the second planetary gear mechanism G2 have opposite directions and equal absolute values to each other, and the following equation holds between the angular velocity $\omega_5$, the angular velocity $\omega_6$ and the turning angular velocity $\omega_7$ of the wheel 9.

$$-\omega_5 = \omega_6 = \varepsilon\omega_7 \quad (5)$$

Next, the operation of the driver 1 according to the disclosure will be described below with reference to FIGS. 4 and 5, for the case where the automatic guided vehicle travels straight, and for the case where the automatic guided vehicle turns and travels or turns only (turns while stopped), respectively.

When the automatic guided vehicle travels straight, the ECU 30 rotates and drives the first motor M1 and the second motor M2 in the same direction (forward rotation or reverse rotation) at the same speed. Then, the rotation of the first motor M1 and the second motor M2 is transmitted from the respective sun gears s1 and s2 of the first planetary gear mechanism G1 and the second planetary gear mechanism G2 to the wheel axle 8 via the planetary gears p1 and p2 and the carriers c1 and c2, and is also transmitted from the ring gears r1 and r2 to the crown gear 2. Here, the ring gears r1 and r2 try to rotate in the same direction, but when these ring gears r1 and r2 rotate at the same speed in the same direction, the rotation of the crown gear 2 is locked and the turning angular velocity $\omega_7$ of the wheel 9 with respect to the crown gear 2 is 0 ($\omega_7=0$) as shown in FIG. 5.

As described above, when the rotation of the crown gear 2 is locked, the rotation of the ring gears r1 and r2 that mesh with the crown gear 2 is also locked, and as is clear from FIG. 5 and the equation (5), the angular velocities $\omega_5$ and $\omega_6$ of the ring gears r1 and r2 are both 0 ($\omega_5=\omega_6=0$).

Therefore, both the first planetary gear mechanism G1 and the second planetary gear mechanism G2 act as a deceleration mechanism, and rotate around the shaft 16 by the driving force input from the sun gears s1 and s2 while rotating in a state where the planetary gears p1 and p2 that revolve around the sun gears s1 and s2 and the carriers c1 and c2 that support these planetary gears p1 and p2 are decelerated. As described above, when the carriers c1 and c2 rotate, the wheel axle 8 and the wheel 9 to which the carriers c1 and c2 are connected rotate, and the automatic guided vehicle travels straight (forward or backward).

Here, the angular velocity $\omega_1$ of the first motor M1 and the angular velocity $\omega_2$ of the second motor M2 are both 100 (relative numerical values, not absolute actual numerical values rad/sec), for example, as shown in FIG. 5, and when it is assumed that gear ratios $\xi=4$ and $\varepsilon=5$, for example, the angular velocity $\omega_3$ of the carrier c1 of the first planetary gear mechanism G1 and the angular velocity $\omega_4$ of the carrier c2 of the second planetary gear mechanism G2 are $\omega_3=\omega_4=20$, for example, as shown in FIG. 5 based on the equations (1) and (2). That is, the rotation speeds of the first motor M1 and the second motor M2 are decelerated to ⅕ (torque is amplified five times), for example, and is transmitted to the wheel axle 8 and the wheel 9.

When the automatic guided vehicle turns and travels, the ECU 30 rotates and drives the first motor M1 and the second motor M2 in the same direction with a speed difference from each other. Then, as in the case of traveling straight, the rotation of the first motor M1 and the second motor M2 is transmitted from the respective sun gears s1 and s2 of the first planetary gear mechanism G1 and the second planetary gear mechanism G2 to the wheel axle 8 via the planetary gears p1 and p2 and the carriers c1 and c2, and is also transmitted from the ring gears r1 and r2 to the crown gear 2. Here, as shown in FIG. 5, when the angular velocity $\omega_1$ of the first motor M1 is 120, for example, and the angular velocity $\omega_2$ of the second motor M2 is 80, for example, the angular velocity $\omega_3$ of the carrier c1 of the first planetary gear mechanism G1 and the angular velocity $\omega_4$ of the carrier c2 of the second planetary gear mechanism G2, which are connected to the wheel axle 8, are equal ($\omega_3=\omega_4$) as shown in the equation (3), and $\omega_3=\omega_4=20$, for example, as in the case of traveling straight (see FIG. 5). In this case, the ring gear r1 of the first planetary gear mechanism G1 and the ring gear r2 of the second planetary gear mechanism G2 rotate in opposite directions at angular velocities $\omega_5$ and $\omega_6$, respectively, and the frame 4 and the wheel 9 supported by the frame 4 rotate on a horizontal plane around the support shaft 3 at the angular velocity $\omega_7$ with respect to the crown gear 2 meshing with the ring gears r1 and r2. In this way, the wheel 9 rotates around the support shaft 3 at the angular velocity $\omega_7$, which enables the automatic guided vehicle to turn and travel.

Here, when the angular velocity $\omega_5$ of the ring gear r1 of the first planetary gear mechanism G1 and the angular velocity $\omega_6$ of the ring gear r2 of the second planetary gear mechanism G2 are obtained by the equations (1) and (2), respectively, as shown in FIG. 5, $\omega_5=-5$ and $\omega_6=5$, for example. Further, when the turning speed $\omega_7$ of the wheel 9 is obtained from the equation (5), as shown in FIG. 5, $\omega_7=1$, for example.

When the automatic guided vehicle turns on the spot while the automatic guided vehicle is stopped, the ECU 30 rotates and drives the first motor M1 and the second motor M2 in opposite directions at the same speed. In this case, as shown in FIG. 5, the angular velocity $\omega_3$ of the carrier c1 of the first planetary gear mechanism G1 and the angular velocity $\omega_4$ of the carrier c2 of the second planetary gear mechanism G2, which are directly connected to the wheel axle 8, are both 0 ($\omega_3=\omega_4=0$). Therefore, in this state, the planetary gears p1 of the first planetary gear mechanism G1 and the planetary gears p2 of the second planetary gear mechanism G2 rotate without revolving around the sun gears s1 and s2, and the ring gears r1 and r2 are rotated in opposite directions at the angular velocities $\omega_5$ and $\omega_6$, respectively. As a result, the frame 4 and the wheel axle 8 and the wheel 9 supported by the frame 4 rotate in a horizontal direction around the support shaft 3 at the angular velocity $\omega_7$, and as the wheel 9 rotates about the support shaft 3 in this way, the automatic guided vehicle turns on the spot at the angular velocity $\omega_7$.

At this time, as shown in FIG. 5, assuming that the first motor M1 is rotated and driven at the angular velocity $\omega_1=20$, for example, and the second motor M2 is rotated and driven at the angular velocity $\omega_2=-20$, for example, the angular velocity $\omega_5$ of the ring gear r1 of the first planetary gear mechanism G1 and the angular velocity $\omega_6$ of the ring gear r2 of the second planetary gear mechanism G2 are obtained from the equations (1) and (2) as follows, respectively.

$$\omega_5=-\omega_1/\xi=-20/4=-5$$

$$\omega_6=-\omega_1/\xi=20/4=5$$

Further, the turning angular velocity $\omega_7$ of the wheel 9 is obtained from the equation (5) as follows.

$$\omega_7=-\omega_5/\varepsilon=\omega_6/\varepsilon=5/5=1$$

As is clear from the above description, according to the driver 1 according to the disclosure, the driving force of the pair of the first motor M1 and the second motor M2 is used for both traveling and turning of the automatic guided vehicle. Therefore, the driving force required for the first motor M1 and the second motor M2 is small, and the miniaturization and power saving of the first motor M1 and the second motor M2 are realized, and as a result, the effects of power saving and compactness/miniaturization of the driver 1 are achievable.

Next, a second exemplary embodiment of the disclosure will be described below with reference to FIGS. 6 to 9.

Figure 6:
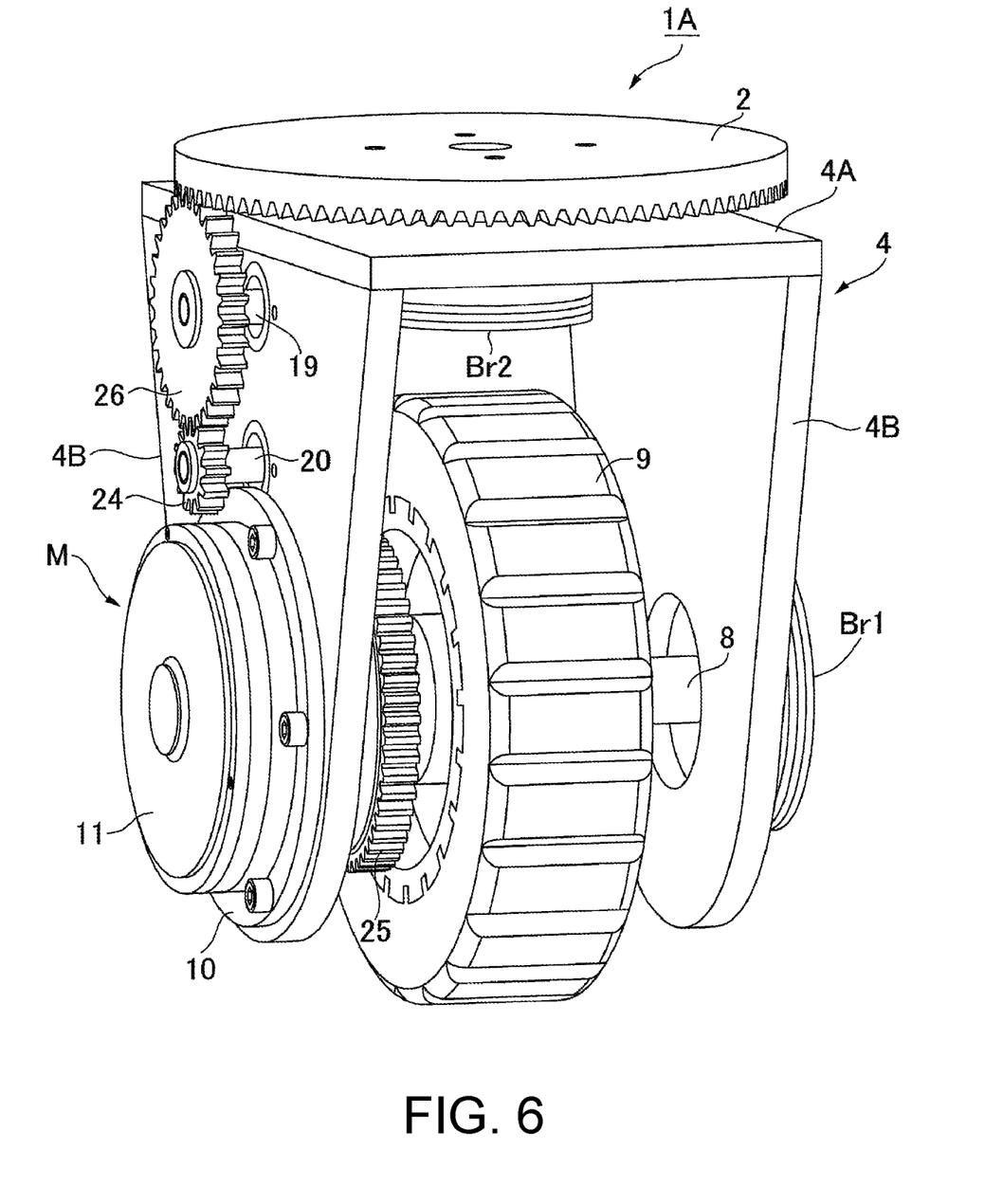
FIG. 6 is a perspective diagram of a driver of an automatic guided vehicle according to the second exemplary embodiment of the disclosure.
Figure 7:
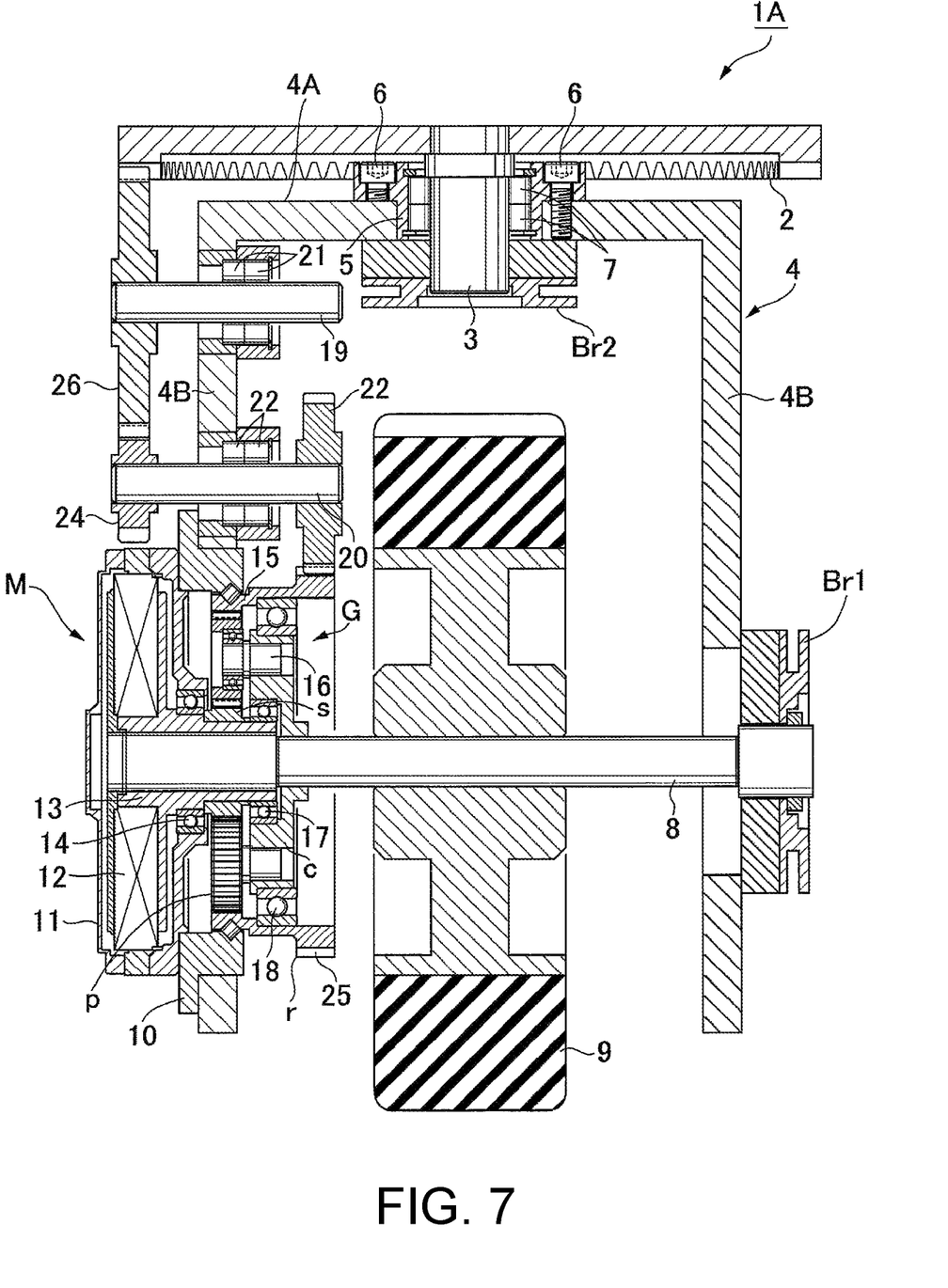
FIG. 7 is a vertical cross-sectional diagram of the driver of the automatic guided vehicle according to the second exemplary embodiment of the disclosure.
Figure 8:
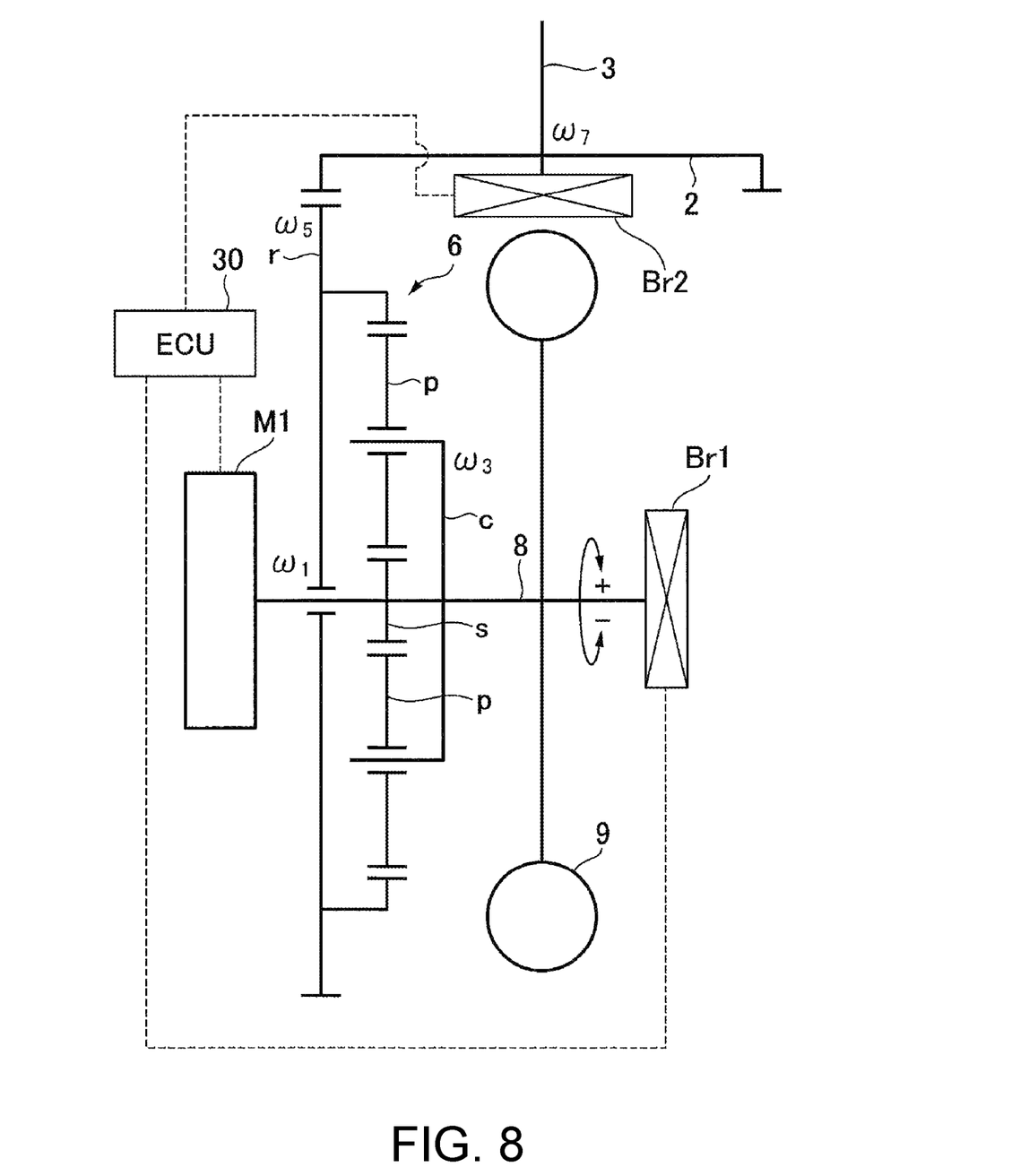
FIG. 8 is a diagram schematically showing a configuration of a drive system of the driver of the automatic guided vehicle according to the second exemplary embodiment of the disclosure.
Figure 9:
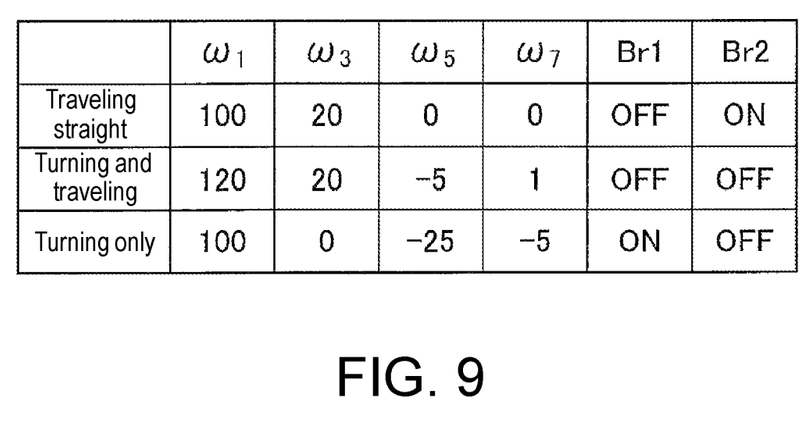
FIG. 9 is a diagram showing values of the angular velocities of each rotator and the on/off of the brake of the driver of the automatic guided vehicle according to the second exemplary embodiment of the disclosure in a table.

FIG. 6 is a perspective diagram of a driver of an automatic guided vehicle according to the second exemplary embodiment of the disclosure. FIG. 7 is a vertical cross-sectional diagram of the same driver. FIG. 8 is a diagram schematically showing a configuration of a drive system of the same driver. FIG. 9 is a diagram showing values of the angular velocities of each rotator and the on/off of the brake of the same driver of the automatic guided vehicle in a table. In FIGS. 6 to 8, the same elements as the ones shown in FIGS. 1 to 4 are designated by the same reference numerals, and the descriptions thereof will be omitted below.

A driver 1A according to the disclosure, as shown in FIGS. 6 and 7, includes a motor M and a planetary gear mechanism G provided at one end in the axial direction of the wheel axle 8 (the left end in FIG. 2), a first brake Br1 provided at the other end in the axial direction of the wheel axle 8 (right end in FIG. 2), and a second brake Br2 attached to the lower end of the support shaft 3. Other configurations including the gear train and the like are the same as those of the first exemplary embodiment. Further, it is the same as the first exemplary embodiment that the final gear 26 and the crown gear 2 that mesh with each other may be provided by bevel gears.

The configuration of the electric motor M is the same as the configuration of the first motor M1 and the second motor M2 according to the first exemplary embodiment, and the configuration of the planetary gear mechanism G is also the same as the configuration of the first planetary gear mechanism G1 and the second planetary gear mechanism G2 according to the first exemplary embodiment. That is, the motor M is configured to house the stator 12 and the rotor 13 in the motor housing 11, and the planetary gear mechanism G includes a sun gear s, a ring gear r, multiple (three) planetary gears p, and a carrier c.

Further, both the first brake Br1 and the second brake Br2 are provided by electromagnetic brakes, and the first brake Br1 has a function of locking the rotation of the wheel axle 8 (wheel 9) by being turned on and unlocking the rotation of the wheel axle 8 (wheel 9) by being turned off. Further, the brake Br2 has a function of locking the turning of the wheel 9 by being turned on and unlocking the turning of the wheel 9 by being turned off.

Here, the configuration of the drive system of the driver 1 according to this embodiment is schematically shown in FIG. 8. In this figure, as in FIG. 4, the ring gear r includes two intermediate gears 23 and 24 and one final gear 26. For convenience, the ring gear r is shown as directly meshing with the crown gear 2.

Further, the driver 1A according to the disclosure includes an ECU 30 as a controller for controlling the rotation speed of the motor M and the on/off of the first brake Br1 and the second brake Br2, and the ECU 30 is electrically connected to the motor M and the first brake Br1 and the second brake Br2.

Here, as shown in FIG. 8, the angular velocity of the motor M is $\omega_1$; the angular velocity of the carrier c of the planetary gear mechanism G is $\omega_3$; the angular velocity of the ring gear r is $\omega_5$; the turning angular velocity of the wheel 9 is $\omega_7$; the gear ratio of the sun gear s to the ring gear r is $\xi$; and the gear ratio of the ring gear r to the crown gear 2 is $\varepsilon$, and the following equations hold between them. As shown in FIG. 8, the + direction of the illustrated arrow of the wheel axle 8 is forward rotation, and the − direction is reverse rotation.

$$\omega_1=(1+\xi)\omega_3-\xi\omega_5 \qquad (6)$$

Here, when the first brake Br1 is turned on and the rotation of the wheel axle 8 (wheel 9) is locked, the angular velocity $\omega_3$ of the carrier c of the planetary gear mechanism G is $\omega_3=0$, for example. Therefore, the equation (6) is expressed as follows.

$$\omega_1=-\xi\omega_5=-\xi\varepsilon\omega_7 \qquad (7)$$

Further, when the second brake Br2 is turned on and the rotation of the ring gear r is locked, the angular velocity $\omega_5$ of the ring gear r is $\omega_5=0$, for example. Therefore, the equation (6) is expressed as follows.

$$\omega_1=(1+\xi)\omega_3 \qquad (8)$$

Next, the operation of the driver 1A according to the disclosure will be described below with reference to FIGS. 8 and 9, for the case where the automatic guided vehicle travels straight, and for the case where the automatic guided vehicle turns and travels or turns only (turns while stopped), respectively.

When the automatic guided vehicle travels straight, the ECU 30 rotates and drives the motor M at a predetermined speed in a state where the first brake Br1 is turned off and the second brake Br2 is turned on, and the turning of the wheel 9 and the rotation of the ring gear r of the planetary gear mechanism G are locked. Then, the rotation of the motor M is transmitted from the sun gear s of the planetary gear mechanism G to the wheel axle 8 via the planetary gears p and the carrier c, and the wheel axle 8 and the wheel 9 connected to the wheel axle 8 rotate, and the automatic guided vehicle travels straight (forward or backward).

Here, assuming that the angular velocity $\omega_1$ of the motor M is 100 as shown in FIG. 9 and the gear ratio $\xi=4$, $\varepsilon=5$, for example, the angular velocity $\omega_3$ of the carrier c of the planetary gear mechanism G is obtained from the equation (8) as follows.

$$\omega_3=\omega_1/(1+\xi)=100/5=20$$

Therefore, the rotation speed of the motor M is decelerated to 1/5 (torque is amplified five times), for example, and transmitted to the wheel axle 8 and the wheel 9.

When the automatic guided vehicle turns and travels, the ECU 30 turns off both the first brake Br1 and the second brake Br2 and rotates and drives the motor M at a predetermined speed, as shown in FIG. 9. Then, the rotation of the motor M is transmitted from the sun gear s of the planetary gear mechanism G to the wheel axle 8 via the planetary gears p and the carrier c, and is also transmitted from the ring gear r to the crown gear 2. Here, as shown in FIG. 9, the angular velocity $\omega_1$ of the motor M is 120, for example, and the angular velocity $\omega_3$ of the carrier c connected to the wheel axle 8 of the planetary gear mechanism G is $\omega_3=20$, for example. In this case, the ring gear r of the planetary gear mechanism G rotates at the angular velocity $\omega_5$, and the frame 4 and the wheel 9 supported by the frame 4 rotate on a horizontal plane around the support shaft 3 at the angular velocity $\omega_7$ with respect to the crown gear 2 meshing with the ring gear r. In this way, the wheel 9 rotates around the support shaft 3 at the angular velocity $\omega_7$, which enables the automatic guided vehicle to turn and travel.

Here, when the angular velocity $\omega_5$ of the ring gear r of the planetary gear mechanism G is obtained by the equation (6), it is obtained that $\omega_5=-5$, for example, as shown in FIG. 9.

$$\omega_5=((1+\xi)\omega_3-\omega_1)/\xi$$

$$=(5\times 20-120)/4=-5$$

(see FIG. 9).

Further, when the turning angular velocity $\omega_7$ of the wheel 9 is obtained from the equation (7), it is obtained that $$\omega_7=\omega_5/\varepsilon=-5/5=-1$$

(see FIG. 9).

When the automatic guided vehicle turns on the spot while the automatic guided vehicle is stopped, the ECU 30 turns on the first brake Br1, turns off the second brake Br2, and rotates and drives the motor M at a predetermined speed. In this case, since the rotation of the wheel axle 8 (wheel 9) is locked, the rotation of the carrier c of the planetary gear mechanism G connected to the wheel axle 8 is also locked, and as shown in FIG. 9, the angular velocity $\omega_3$ of the carrier c becomes 0 ($\omega_3=0$). Therefore, in this state, the planetary gears p of the planetary gear mechanism G rotate without revolving around the sun gear s, and the ring gear r is rotated at the angular velocity $\omega_5$. As a result, the frame 4 and the wheel axle 8 and the wheel 9 supported by the frame 4 rotate in a horizontal direction around the support shaft 3 at the angular velocity $\omega_7$, and as the wheel 9 rotates about the support shaft 3 in this way, the automatic guided vehicle turns on the spot at the angular velocity $\omega_7$.

At this time, as shown in FIG. 9, assuming that the motor M is rotated and driven at the angular velocity $\omega_1=100$, for example, the angular velocity $\omega_5$ of the ring gear r of the planetary gear mechanism G is obtained from the equation (7) as follows.

$$\omega_5=-\omega_1/\xi=-100/4=-25$$

Further, the turning angular velocity $\omega_7$ of the wheel 9 is obtained from the equation (7) as follows (see FIG. 9).

$$\omega_7=\omega_5/\varepsilon=-25/5=-5$$

As is clear from the above description, according to the driver 1A according to the disclosure, the driving force of one motor M causes the automatic guided vehicle to travel and turn. Therefore, further miniaturization and power saving of the motor M become possible, and the effects of further power saving and miniaturization/compactness of the driver 1A are achievable.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A driver of an automatic guided vehicle, comprising:
a turning gear fixed to a bottom of a vehicle body;
a support shaft penetrating a center of the turning gear and extending vertically from the vehicle body;
a frame supported by the support shaft to be rotatable on a horizontal plane;
a wheel axle rotatably and horizontally provided on the frame; and
a wheel connected to the wheel axle,
wherein a first motor and a second motor, which are drive sources, and a first planetary gear mechanism and a second planetary gear mechanism are provided at both ends in an axial direction of the wheel axle, respectively,
wherein the first motor includes a first hollow shaft rotor, and the second motor includes a second hollow shaft rotor,
a motor output shaft of the first motor and a motor output shaft of the second motor are aligned coaxially with the wheel axle, the wheel axle is fitted to the first hollow shaft rotor and the second hollow shaft rotor, and
each carrier of the first and second planetary gear mechanisms is connected to the wheel axle, and each ring gear of the first and second planetary gear mechanisms meshes with the turning gear.

2. The driver of the automatic guided vehicle according to claim 1, wherein each of the ring gears meshes with the turning gear via a plurality of gear trains.

3. The driver of the automatic guided vehicle according to claim 2, wherein a pair of the first and second motors, the first and second planetary gear mechanisms, and the respective gear trains are symmetrically provided on both sides of the wheel.

4. The driver of the automatic guided vehicle according to claim 1, further comprising a controller for controlling rotation directions and rotation speeds of the first and second motors,
wherein the controller:
rotates and drives the first and second motors in a same direction at a same speed when the automatic guided vehicle travels straight,
rotates and drives the first and second motors in a same direction with a predetermined speed difference when the automatic guided vehicle turns and travels, and rotates and drives the first and second motors in opposite directions at a same speed when the automatic guided vehicle turns only.

5. A driver of an automatic guided vehicle, comprising:
a turning gear fixed to a bottom of a vehicle body;
a support shaft penetrating a center of the turning gear and extending vertically from the vehicle body;
a frame supported by the support shaft to be rotatable on a horizontal plane;
a wheel axle rotatably and horizontally provided on the frame; and
a wheel connected to the wheel axle,
wherein a motor, which is a drive source, and a planetary gear mechanism are provided at one end in an axial direction of the wheel axle, a first brake is attached to the other end in the axial direction of the wheel axle, and a second brake is attached to the support shaft,
wherein the motor includes a hollow shaft rotor,
a motor output shaft of the motor is aligned coaxially with the wheel axle, the wheel axle is fitted to the hollow shaft rotor, and
a carrier of the planetary gear mechanism is connected to the wheel axle, and a ring gear of the planetary gear mechanism is meshed with the turning gear.

6. The driver of the automatic guided vehicle according to claim 5, wherein the ring gear meshes with the turning gear via a plurality of gear trains.

7. The driver of the automatic guided vehicle according to claim 5, further comprising a controller for controlling a rotation direction and a rotation speed of the motor and on/off of the first brake and the second brake,
wherein the controller:
rotates and drives the motor at a predetermined speed in a state where the first brake is turned off and the second brake is turned on when the automatic guided vehicle travels straight,
rotates and drives the motor at a predetermined speed in a state where both the first brake and the second brake are turned off when the automatic guided vehicle turns and travels, and
rotates and drives the motor at a predetermined speed in a state where the first brake is turned on and the second brake is turned off when the automatic guided vehicle turns only.

* * * * *